US012772999B2

(12) United States Patent
Jia et al.

(10) Patent No.: US 12,772,999 B2
(45) Date of Patent: Oct. 27, 2026

(54) SWEETNESS ENHANCING COMPOSITIONS

(71) Applicant: Givaudan S.A., Vernier (CH)

(72) Inventors: Zhonghua Jia, Cincinnati, OH (US); Xiaogen Yang, West Chester, OH (US); Esther Van Ommeren, Lelystad (NL); Jenifer Augelli, Cincinnati, OH (US); Adam Moyle, Umina (AU); Kimberley Gray, Loveland, OH (US)

(73) Assignee: Givaudan S.A., Vernier (CH)

( * ) Notice: Subject to any disclaimer, the term of this patent is extended or adjusted under 35 U.S.C. 154(b) by 56 days.

(21) Appl. No.: 14/352,223

(22) PCT Filed: Oct. 24, 2012

(86) PCT No.: PCT/EP2012/071088

§ 371 (c)(1),
(2) Date: Apr. 16, 2014

(87) PCT Pub. No.: WO2013/060746

PCT Pub. Date: May 2, 2013

(65) Prior Publication Data

US 2014/0370177 A1 Dec. 18, 2014

Related U.S. Application Data

(60) Provisional application No. 61/550,495, filed on Oct. 24, 2011.

(51) Int. Cl.

*A23L 5/00* (2016.01)
*A23L 7/00* (2016.01)
*A23L 27/30* (2016.01)
*A23L 29/30* (2016.01)
*A23L 21/00* (2016.01)

(52) U.S. Cl.

CPC .................. *A23L 5/00* (2016.08); *A23L 7/00* (2016.08); *A23L 27/33* (2016.08); *A23L 27/36* (2016.08); *A23L 29/30* (2016.08); *A23L 21/00* (2016.08); *A23V 2002/00* (2013.01); *A23V 2200/16* (2013.01); *A23V 2250/258* (2013.01); *A23V 2250/262* (2013.01)

(58) Field of Classification Search

CPC ... A23L 5/00; A23L 7/00; A23L 27/33; A23L 29/30; A23L 27/36; A23L 21/00; A23L 29/00; A23V 2002/00; A23V 2200/16; A23V 2250/258; A23V 2250/262

USPC ................................................ 426/548, 658

See application file for complete search history.

(56) References Cited

U.S. PATENT DOCUMENTS

| | | | |
|---|---|---|---|
| 2,766,145 A | 10/1956 | O'Brien | |
| 2,766,148 A | 10/1956 | Rowland | |
| 3,344,796 A | 10/1967 | Yamaji et al. | |
| 3,857,962 A | 12/1974 | Westall et al. | |
| 4,219,571 A | 8/1980 | Miyake | |
| 4,361,697 A | 11/1982 | Dobberstein et al. | |
| 4,402,990 A | 9/1983 | Dubois | |
| 4,404,367 A | 9/1983 | Stephenson et al. | |
| 4,454,290 A | 6/1984 | Dubois | |
| 4,495,170 A | 1/1985 | Beyts et al. | |
| 4,497,835 A | 2/1985 | Winston | |
| 4,612,942 A | 9/1986 | Dobberstein et al. | |
| 5,433,965 A | 7/1995 | Fischer | |
| 6,255,557 B1 | 7/2001 | Brandle | |
| 6,255,558 B1 | 7/2001 | Brandle | |
| 6,368,651 B1 | 4/2002 | Gerlat | |
| 6,413,558 B1 | 7/2002 | Weber et al. | |
| 6,461,659 B1 | 10/2002 | Zhou | |
| 6,599,534 B2 | 7/2003 | Felisaz | |
| 7,267,835 B2 | 9/2007 | Kitazume et al. | |
| 7,579,032 B2 | 8/2009 | Lee et al. | |
| 7,807,206 B2 | 10/2010 | Magomet et al. | |
| 2002/0132037 A1 | 9/2002 | Zhou | |
| 2002/0197371 A1 | 12/2002 | Lee et al. | |
| 2003/0108627 A1 | 6/2003 | Selzer et al. | |
| 2003/0138538 A1 | 7/2003 | Kitazume et al. | |
| 2004/0022914 A1 | 2/2004 | Allen | |
| 2007/0009638 A1 | 1/2007 | Takemori et al. | |
| 2009/0280232 A1 | 11/2009 | Lee et al. | |
| 2010/0015320 A1 | 1/2010 | King | |
| 2010/0092638 A1 | 4/2010 | Hansen et al. | |
| 2010/0112159 A1 * | 5/2010 | Abelyan | A23G 3/36 426/271 |
| 2010/0112171 A1 | 5/2010 | Abelyan et al. | |
| 2010/0227034 A1 | 9/2010 | Purkayastha et al. | |
| 2011/0160311 A1 | 6/2011 | Prakash et al. | |
| 2012/0164083 A1 | 6/2012 | Palmer et al. | |
| 2012/0308706 A1 | 12/2012 | Hansen et al. | |

(Continued)

FOREIGN PATENT DOCUMENTS

| | | |
|---|---|---|
| EP | 0920861 A | 6/1999 |
| EP | 1295533 A1 | 3/2003 |
| EP | 1673986 A2 | 6/2006 |

(Continued)

OTHER PUBLICATIONS

Sweet Combinations, Prepared Foods, Oct. 1, 2006.*
Hazen, Food Product Design, vol. 21 No. 2 Feb. 2011, pp. 1-7.*
Machine Translation of Iida et al., JP 2004344071, Dec. 2004 (Year: 2004).*
S. S. Schiffman et al., "Investigation of Synergism In Binary Mixtures of Sweeteners", XP-002428872, Brain Research Bulletin, 1995, vol. 38, No. 2, pp. 105-120, Elsevier Science Ltd., USA.
Jan H.A. Kroeze, "Neohesperidin Dihydrochalcone is Not a Taste Enhancer in Aqueous Sucrose Solutions", Chem. Senses, 2000, vol. 25, pp. 555-559.
S. S. Schiffman et al., "Synergism among Ternary Mixtures of Fourteen Sweeteners", Chem. Senses, 2000, vol. 25, pp. 131-140.
S. S. Schiffman et al., "Time to maximum sweetness intensity of binary and ternary blends of sweeteners", Food Quality and Preference, 2006, Elsevier Science Ltd., USA.

(Continued)

*Primary Examiner* — Emily M Le
*Assistant Examiner* — Tynesha L McClain
(74) *Attorney, Agent, or Firm* — Curatolo Sidoti & Trillis Co., LPA; Salvatore A. Sidoti; Floyd Trillis, III

(57) ABSTRACT

A mixture of the individual ingredients stevioside and rebaudioside A provided in a ratio of stevioside to rebaudioside A of about 1:1 to about 4:1.

13 Claims, No Drawings

(56) References Cited

U.S. PATENT DOCUMENTS

2013/0011540 A1 1/2013 Hansen et al.

FOREIGN PATENT DOCUMENTS

| | | | |
|---|---|---|---|
| JP | 52-083731 A | | 7/1977 |
| JP | 56-042560 A | | 4/1981 |
| JP | 58-149655 A | | 9/1983 |
| JP | 08-000214 A | | 1/1996 |
| JP | 09-194370 A | | 7/1997 |
| JP | 10-191944 A | | 7/1998 |
| JP | 10-262599 A | | 10/1998 |
| JP | 10-276712 A | | 10/1998 |
| JP | 11-346708 A | | 12/1999 |
| JP | 2000-041639 A | | 2/2000 |
| JP | 2001-120218 A | | 5/2001 |
| JP | 2002-034501 A | | 2/2002 |
| JP | 2003-164268 A | | 6/2003 |
| JP | 2004344071 A | * | 12/2004 |
| WO | WO 91/03147 A2 | | 3/1991 |
| WO | WO 94/18855 A1 | | 9/1994 |
| WO | WO 99/34689 A1 | | 7/1999 |
| WO | WO 02/087358 A1 | | 11/2002 |
| WO | WO 2006/072879 A1 | | 7/2006 |
| WO | WO 2008/049256 A1 | | 5/2008 |
| WO | WO 2008/148239 A1 | | 12/2008 |
| WO | WO 2011/028671 A1 | | 3/2011 |
| WO | WO 2011/059954 A1 | | 5/2011 |
| WO | WO 2012/006728 A1 | | 1/2012 |

OTHER PUBLICATIONS

Kinghorn, Douglas A., et al., "Stevia, the genus stevia", Taylor and Francis, London, 2002, pp. 1-17, pp. 178-193.

Kinghorn, Douglas A., et al., "Less Common High-Potency Sweeteners", Food Science and Technology, 2001, pp. 209-233.

Rompp, Encyclopedia "CHEMIE", 10th Edition, 1998, pp. 4302-4304.

Wang, et al., "Evaluation of Sweeteners and Flavour Mixes containing Acesulfame K and Other Sweeteners", Food Science, 1994.

PCT/CH2007/000521—International Search Report, Feb. 25, 2008.

PCT/CH2007/000521—Written Opinion of the International Searching Authority, Feb. 25, 2008.

PCT/CH2007/000521—International Preliminary Report on Patentability, Apr. 28, 2009.

Geitz, Holger, Opposition to European Patent Application 2 079 319, Oct. 4, 2011.

Cargill Incorporated, Opposition to European Patent Application 2 079 319, Oct. 5, 2011.

Vossius, Third Party Observation Submitted in Opposition to European Patent Application 2 079 319, Sep. 20, 2012.

Kinghorn, A. Douglas and Soejarto, Djaja D., "Current Status of Stevioside as a Sweetening Agent for Human Use", Economic and Medicinal Plant Research, 1985, Chapter 1, pp. 2-52, Academic Press, Inc., Orlando, Florida.

Nabors, Lyn O'Brien, "Alternative Sweeteners", 2001, Marcel-Dekker Inc., New York, New York, Chapter 1, pp. 1-12.

Amano Enzyme Company, "Processing of starch", www.amano-enzyme.co.jp/eng/productuse/strach.html, Sep. 5, 2012.

Goto, Airton and Clemente, Edmar, "Influence of the Solubility Rebaudioside A and Stevioside", Ciencia E Tecnologia De Alimentos, Apr. 30, 1998, vol. 18, No. 1, pp. 1-8.

PCT/EP2012/071088—International Search Report, Mar. 12, 2013.

PCT/EP2012/071088—Written Opinion of the International Searching Authority, Mar. 12, 2013.

PCT/EP2012/071088—International Preliminary Report on Patentability, Apr. 29, 2014.

GB 1121028.3—Great Britain Search Report, Mar. 28, 2012.

N. Kolb, et al., Analysis of Sweet Diterpene Glycosides from *Stevia rebaudiana*: Improved HPLC Method J. Agric. Food Chem. (2001) vol. 49, Issue 10, pp. 4538-4541.

* cited by examiner

SWEETNESS ENHANCING COMPOSITIONS

CROSS REFERENCE TO RELATED APPLICATIONS

This application is a national stage application of International Application No. PCT/EP2012/071088, filed 24 Oct. 2012, which claims priority from U.S. Provisional Patent Application No. 61/550,495, filed 24 Oct. 2011, from which applications priority is claimed, and which are incorporated herein by reference.

The present invention is concerned with a sweetness enhancing composition and with an orally consumable composition containing same. The present invention is also concerned with methods of enhancing the sweetness of orally consumable compositions.

Steviol glycosides are responsible for the sweet taste of the *stevia* plant (*Stevia Rebaudiana*, (Bertoni) Bertoni, family Compositae). The leaves of *Stevia* plant contain at least 10 steviol glycosides. The major ingredient is stevioside with a natural abundance around 4-14% by weight, followed by rebaudioside A (typically 2-4% by weight), and rebaudioside C (or called dulcoside B, ca 1%). Other minor steviol glycosides include dulcoside A, rebaudiosides B, D, E, and F, rubusoside, and steviobioside. The total contents of steviol glycosides and the individual components in the leaves vary depending upon its species and conditions at the location of cultivation, such as temperature, latitude as well as the harvesting time. The abundance of individual steviol glycosides can be specifically enriched through natural hybrid or genetic modification.

Rebaudioside A is the most potent sweetener and is regarded as having the best taste amongst all the steviol glycosides. Indeed, it is the first natural sweetener to be used in beverage and food applications in the United States. However, despite it being generally regarded as having the most desirable taste profile, this material still has associated with its use an unwanted or unpleasant after taste that has been described as a lingering, liquorice-type bitterness. This remains an issue regarding its use in food and beverage applications. Further, just like other high potency sweeteners, rebaudioside A lacks the upfront sweetness, body and possesses the lingering after-taste even when used at low levels as a sweetness enhancer.

Much work has been undertaken to reduce or eliminate the unpleasant after taste of associated with steviol glycosides, and with regard to rebaudioside A, current practice is to separate rebaudioside A from other steviol glycosides and employ it in a highly pure form. Unfortunately, obtaining rebaudioside A in highly pure form from *stevia* plant extracts is complex, time-consuming and expensive There remains a need to provide sweetness enhancing compositions that perform substantially similarly to or better than rebaudioside A, but which are less costly.

Applicant arrived at a solution to this problem in a surprising manner.

Accordingly, the invention provides in a first aspect a composition comprising a mixture of stevioside and rebaudioside A in a stevioside to rebaudioside A ratio of about 1:1 to about 4:1, more particularly about 2:1 to 3:1.

The invention resides in the surprising discovery that mixtures relatively rich in stevioside and relative poor in rebaudioside A nevertheless can enhance sweetness of sweetened compositions in a way that is substantially similar to or even better than pure rebaudioside A. Applicant arrived at this surprising discovery whilst working on fractionation of a commercial *stevia* extract. Applicant generated a fraction that was prepared for tasting and discovered to its surprise that it was at least as good as, or even better than pure rebaudioside A in terms of sweetness enhancement on top of a sugar solution. Additionally, the flavour profile was assessed as less lingering and lacked the liquorice bitterness of rebaudioside A, and it had a profile substantially similar to sugar itself.

Upon analysis, applicant found this fraction to contain stevioside and rebaudioside A. Surprisingly, the fraction was relatively rich in stevioside and relatively poor in rebaudioside A. This result was indeed surprising given that it is known in the literature that rebaudioside A is far the most potent sweetener of the steviol glycosides, with what is generally considered to be the best taste profile, whereas stevioside is of much lower potency and of poorer taste quality. Additional experimentation confirmed a range of mixtures of stevioside and rebaudioside A that provide desirable sugar-like profiles that are at least as good as or superior even to rebaudioside A in its pure form. More particularly, the mixtures of the present invention were found to have about the same sweetness as rebaudioside A, but they displayed more upfront impact, less licorice lingering off-taste and a much more sugar-like profile than rebaudioside A alone.

Both stevioside and rebaudioside A are known sweeteners. In addition, the sweetness enhancing properties of both rebaudioside A and stevioside are known in the art (see for example US patent US20100092638).

However, applicant is unaware of any prior art teaching related to the effect of mixing stevioside and rebaudioside A on the taste profiles of these mixtures, and in particular the sweetness enhancement effects of the mixtures. Indeed, applicant believes that it is entirely counter-intuitive to consider mixing stevioside with rebaudioside A in the expectation of achieving a desirable result, when the current focus of the flavour industry is concerned with obtaining and using pure forms of rebaudioside A. Why, once having gone to the trouble and expense of isolating pure rebaudioside A, would the skilled person then combine it with what is generally considered to be the poorer performing stevioside?

The mixtures of the present invention can be used in amounts up to 250 ppm or greater if desired. However, at levels higher than 250 ppm bitter up-front notes, believed to be associated with the high levels of stevioside start to become apparent. The acceptability or otherwise of these bitter off-notes will depend somewhat on the nature of the consumable compositions in which the mixtures are to be employed. However, it is preferred to employ the mixture in consumable compositions in amounts lower than 250 ppm.

Indeed, at levels above 250 ppm, our observations suggest that it would be necessary to alter the proportions of stevioside and rebaudioside A in the mixtures such that a much higher amount of the latter and a much lower amount of the former would be necessary if the mixtures were to find any use as sweeteners. In other words, the ratio of ingredients in the mixtures of the present invention would not be appropriate when the mixture is employed at levels of 250 ppm or greater.

It is preferred to employ mixtures of the present invention in amounts of 150 ppm or less, more particularly 90 ppm or less, more particularly 60 ppm or less, more particularly 45 ppm or less, more particularly 40 ppm or less, still more particularly 35 ppm or less.

It is particularly preferred to use the mixtures in amounts wherein they are not sweet-tasting in and of themselves, that is, it is preferred to use the mixtures at our near the sweetness detection threshold.

The sweetness detection threshold of rebaudioside A and stevioside is discussed in US20100092638, which is incorporated by reference. The term sweetness detection threshold is known in the art, and a discussion of this can be found in US20100092638. In relation to the present invention, it refers to a concentration at which the mixture is not perceived as sweet. However, the mixtures at their sweetness detection threshold nevertheless can exert on a composition containing a sweetener.

The sweetness detection threshold may not be absolute for the mixture, and may depend on the presence of other ingredients that may be present in a composition containing said mixture, or on other stimuli that a consumer experiences during consumption of the mixture. In addition, it is known that sweetness detection thresholds can vary somewhat from individual to individual. For example, some individuals are able to detect the sweetness of sucrose in a very low concentration, e.g. at 0.4%, whereas others can only detect at 0.7% or even higher. Accordingly, it is typical to perform such assessments objectively using sweet sensitive panelists able to detect at least 0.5% of sucrose or less. As a matter of generality, such panelists would rate a 1.00% sucrose solution as being practically lacking sweetness. Accordingly, the sweetness detection threshold of a sample can be determined as the concentration of that sample that is iso-intense as a 1.25% or lower sucrose solution, more particularly a 1.00% lower sucrose solution. The concentration of a sweetness enhancer at or near its detection threshold can be easily and objectively tested by organoleptic titration techniques that are well known in the field of sensory analysis as more fully described in US20100092638.

In a particular embodiment of the present invention the mixture can be employed in an amount that is iso-sweet with a 1% sucrose solution.

The mixture according to the present invention, when used in amounts referred to hereinabove, and even at its sweetness detection threshold, can exert an enhancing effect on a sweetened composition that adds approximately 1% sucrose equivalence.

If desired, one can add additional sweetness enhancers to mixtures of the present invention. Additional sweetness enhancers may be selected from those disclosed in US20100092638, i.e. trilobtain, hesperetin dihydrochalcone glucoside, naringin dihydrochalcone, mogroside V, Luo Han Guo extract, rubusoside, rubus extract or mixtures thereof. US20100092638, which is hereby incorporated by reference, in addition to disclosing these materials, also proposes usage levels at or below their sweetness detection thresholds.

Other additional sweetness enhancers may include, glycyphyllin, isomogroside V, mogroside IV, siamenoside I, neomogroside, mukurozioside IIb, (+)-hernandulcin, 4β-hydroxyhernandulcin, baiyunoside, phlomisoside I, bryodulcoside, bryoside bryonoside, abrusosides A-E, cyclocarioside A, cyclocaryoside I, albiziasaponins A-E, glycyrrhizin, araboglycyrrhizin, periandrins I-V, pterocaryosides A and B, osladin, polypodosides A and B, telosmoside A8-18, phyllodulcin, huangqioside E neoastilbin, monatin, 3-acetoxy-5,7-dihydroxy-4'-methoxyflavanone, 2R,3R-(+)-3-Acetoxy-5,7,4'-trihydroxyflavanone, (2R,3R)-dihydroquercetin 3-O-acetate, dihydroquercetin 3-O-acetate 4'-methyl ether, brazzein, curculin, mabinlin, monellin, neoculin, pentadin, thaumatin or combinations thereof.

Each of the aforementioned additional sweetness enhancers may be employed in a concentration around its sweetness detection threshold. In the case of trilobtain, hesperitin dihydrochalcone-4-beta-glucoside (HDG), naringin dihydrochalcone, mogroside V, iso-mogroside V, siamenoside I, mogroside IV, neomogroside, Luo Han Guo extract, rubusoside, rubus extract, and NHDC, the sweetness detection thresholds are respectively for trilobtain from 3 to 100 ppm, HDG from 1 to 75 ppm, naringin dihydrochalcone from 2 to 60 ppm, for rubusoside from 1.4 ppm to 56 ppm, for rubus extract from 2 ppm to 80 ppm, for mogroside V from 0.4 ppm to 12.5 ppm, iso-mogroside V from 0.3 to 12 ppm, siamenoside I from 0.2 to 10 ppm, for Luo Han Guo extract from 2 to 60 ppm, and for NHDC from 1 to 5 ppm.

The mixture according to the present invention may be added to a consumable composition containing a sweetener.

The mixture may be added to the consumable composition in order to exert a sweetness enhancing effect. The mixture may be added to a consumable composition alone, or it may form part of a flavour composition, which can be added to the consumable composition.

The flavour composition may comprise, in addition to the mixture of the present invention, one or more sweeteners, one or more additional sweetness enhancers as described above, as well as any flavourants and other standard ingredients commonly used is such compositions as more fully described herein below.

The invention provides in another of its aspects, a consumable composition comprising a sweetener and a sweetness-enhancing composition comprising a mixture of stevioside and rebaudioside A in a ratio of about 1:1 to about 4:1, more particularly about 2:1 to 3:1, and wherein said mixture is employed in said consumable composition at a concentration of 250 ppm or less, more particularly 150 ppm or less, 90 ppm or less, still more particularly 60 ppm or less, more particularly 45 ppm or less, more particularly 40 ppm or less, still more particularly 35 ppm or less.

In an embodiment of the invention said consumable composition contains the mixture in a concentration at our near the sweetness detection threshold, in particular at a level such that the mixture is iso-sweet with 1.25% sucrose or less, still more particularly iso-sweet with 1% sucrose.

The sweetener employed in said consumable composition may be selected from the group consisting of sucrose, fructose, glucose, high fructose corn syrup, corn syrup, xylose, arabinose, rhamnose, erythritol, xylitol, mannitol, sorbitol, inositol, acesulfame potassium, aspartame, neotame, sucralose, and saccharine.

The sweetener may be present in amounts of 0.0001 to 15% by weight of a consumable composition.

A consumable composition of the present invention is any solid or liquid composition that is consumed for at least one of nourishment and pleasure. It may be placed in the mouth before being consumed, or it may be held in the mouth for a period of time before being discarded. Broadly, the consumable composition includes, but is not limited to foodstuffs of all kinds, confectionery, baked goods, sweet goods, dairy products and beverages.

Confectionery includes, but is not limited to chewing gum (which includes sugarized gum, sugar-free gum, functional gum and bubble gum), centre-fill confections, chocolate and other chocolate confectionery, medicated confectionery, lozenges, tablets, pastilles, mints, standard mints, power mints, chewy candies, hard candies, boiled candies, breath and other oral care films or strips, candy canes, lollipops, gummies, jellies, fudge, caramel, hard and soft panned goods, toffee, taffy, liquorice, gelatin candies, gum drops, jelly beans, nougats, fondants, or combinations of one or more of these, or edible compositions incorporating one or more of these.

Baked goods include, but are not limited to alfajores, bread, packaged/industrial bread, unpackaged/artisanal bread, pastries, cakes, packaged/industrial cakes, unpackaged/artisanal cakes, cookies, chocolate coated biscuits, sandwich biscuits, filled biscuits, savory biscuits and crackers, bread substitutes.

Sweet goods include, but are not limited to breakfast cereals, ready-to-eat ("rte") cereals, family breakfast cereals, flakes, muesli, other rte cereals, children's breakfast cereals and hot cereals.

Dairy products include, but are not limited to ice cream, impulse ice cream, single portion dairy ice cream, single portion water ice cream, multi-pack dairy ice cream, multi-pack water ice cream, take-home ice cream, take-home dairy ice cream, ice cream desserts, bulk ice cream, take-home water ice cream, frozen yoghurt, artisanal ice cream, dairy products, milk, fresh/pasteurized milk, full fat fresh/pasteurized milk, semi skimmed fresh/pasteurized milk, long-life/uht milk, full fat long life/uht milk, semi skimmed long life/uht milk, fat-free long life/uht milk, goat milk, condensed/evaporated milk, plain condensed/evaporated milk, flavored, functional and other condensed milk, flavored milk drinks, dairy only flavored milk drinks, flavored milk drinks with fruit juice, soy milk, sour milk drinks, fermented dairy drinks, coffee whiteners, powder milk, flavored powder milk drinks, cream, yoghurt, plain/natural yoghurt, flavored yoghurt, fruited yoghurt, probiotic yoghurt, drinking yoghurt, regular drinking yoghurt, probiotic drinking yoghurt, chilled and shelf-stable desserts, dairy-based desserts and soy-based desserts.

Other foodstuff include, but are not limited to chilled snacks, sweet and savory snacks, fruit snacks, chips/crisps, extruded snacks, tortilla/corn chips, popcorn, pretzels, nuts, other sweet and savory snacks, snack bars, granola bars, breakfast bars, energy bars, fruit bars, other snack bars, meal replacement products, slimming products, convalescence drinks, ready meals, canned ready meals, frozen ready meals, dried ready meals, chilled ready meals, dinner mixes, frozen pizza, chilled pizza, soup, canned soup, dehydrated soup, instant soup, chilled soup, uht soup, frozen soup, pasta, canned pasta, dried pasta, chilled/fresh pasta, noodles, plain noodles, instant noodles, cups/bowl instant noodles, pouch instant noodles, chilled noodles, snack noodles, dried food, dessert mixes, sauces, dressings and condiments, herbs and spices, spreads, jams and preserves, honey, chocolate spreads, nut-based spreads, and yeast-based spreads.

Beverages include any drinkable liquid or semi-liquid, including for example flavored water, soft drinks, fruit drinks, coffee-based drinks, tea-based drinks including tea, black tea, green tea, oolong tea, herbal tea, cocoa-based drinks, juice-based drinks (includes fruit and vegetable), milk-based drinks, gel drinks, carbonated or non-carbonated drinks, powdered drinks and alcoholic or non-alcoholic drinks.

In the preparation of the abovementioned flavour compositions or consumable compositions, there may be used all or any of the standard ingredients found in such compositions, used in art-recognised quantities. Examples of such ingredients include (but are by no means limited to) solvents and co-solvents; surfactants and emulsifiers; viscosity and rheology modifiers; thickening and gelling agents; preservative materials; pigments, dyestuffs and colouring matters; extenders, fillers and reinforcing agents; stabilisers against the detrimental effects of heat and light, bulking agents, flavoring and flavor-enhancing agents, warming agents, breath fresheners, mouth moisteners, coloring agents, acidulants, buffering agents and antioxidants.

Suitable bulking agents may include mineral adjuvants, which may serve as fillers and textural agents. Suitable mineral adjuvants include calcium carbonate, magnesium carbonate, alumina, aluminum hydroxide, aluminum silicate, talc, tricalcium phosphate, tricalcium phosphate and the like, which can serve as fillers and textural agents.

Additional bulking agents (carriers, extenders) suitable for use include monosaccharides, disaccharides, polysaccharides, sugar alcohols, polydextrose, and maltodextrins; minerals, such as calcium carbonate, talc, titanium dioxide, dicalcium phosphate; and combinations thereof.

Fillers modify the texture and aid processing. Examples of such fillers include magnesium and aluminum silicates, clay, alumina, talc, titanium oxide, cellulose polymers, and the like.

Specific examples of flavouring agents include, but are not limited to natural flavors, artificial flavors, spices, seasonings, and the like. Exemplary flavoring agents include synthetic flavor oils and flavoring aromatics and/or oils, oleoresins, essences, distillates, and extracts derived from plants, leaves, flowers, fruits, and so forth, and a combination comprising at least one of the foregoing.

Flavour oils include spearmint oil, cinnamon oil, oil of wintergreen (methyl salicylate), peppermint oil, Japanese mint oil, clove oil, bay oil, anise oil, eucalyptus oil, thyme oil, cedar leaf oil, oil of nutmeg, allspice, oil of sage, mace, oil of bitter almonds, and cassia oil; useful flavoring agents include artificial, natural and synthetic fruit flavors such as vanilla, and citrus oils including lemon, orange, lime, grapefruit, yuzu, sudachi, and fruit essences including apple, pear, peach, grape, blueberry, strawberry, raspberry, cherry, plum, prune, raisin, cola, guarana, neroli, pineapple, apricot, banana, melon, apricot, ume, cherry, raspberry, blackberry, tropical fruit, mango, mangosteen, pomegranate, papaya and so forth. Additional exemplary flavors imparted by a flavoring agent include a milk flavor, a butter flavor, a cheese flavor, a cream flavor, and a yogurt flavor; a vanilla flavor; tea or coffee flavors, such as a green tea flavor, an oolong tea flavor, a tea flavor, a cocoa flavor, a chocolate flavor, and a coffee flavor; mint flavors, such as a peppermint flavor, a spearmint flavor, and a Japanese mint flavor; spicy flavors, such as an asafetida flavor, an ajowan flavor, an anise flavor, an angelica flavor, a fennel flavor, an allspice flavor, a cinnamon flavor, a chamomile flavor, a mustard flavor, a cardamom flavor, a caraway flavor, a cumin flavor, a clove flavor, a pepper flavor, a coriander flavor, a sassafras flavor, a savory flavor, a Zanthoxyli Fructus flavor, a perilla flavor, a juniper berry flavor, a ginger flavor, a star anise flavor, a horseradish flavor, a thyme flavor, a tarragon flavor, a dill flavor, a capsicum flavor, a nutmeg flavor, a basil flavor, a marjoram flavor, a rosemary flavor, a bayleaf flavor, and a wasabi (Japanese horseradish) flavor; a nut flavor such as an almond flavor, a hazelnut flavor, a macadamia nut flavor, a peanut flavor, a pecan flavor, a pistachio flavor, and a walnut flavor; alcoholic flavors, such as a wine flavor, a whisky flavor, a brandy flavor, a rum flavor, a gin flavor, and a liqueur flavor; floral flavors; and vegetable flavors, such as an onion flavor, a garlic flavor, a cabbage flavor, a carrot flavor, a celery flavor, mushroom flavor, and a tomato flavor.

Generally any flavoring or food additive such as those described in Chemicals Used in Food Processing, publication 1274, pages 63-258, by the National Academy of Sciences, can be used. This publication is incorporated herein by reference.

There may additionally be present in nutraceuticals and medicaments.

Suitable nutraceuticals may include herbs and botanicals such as aloe, bilberry, bloodroot, calendula, capsicum, chamomile, cat's claw, echinacea, garlic, ginger, ginkgo, goldenseal, various ginseng, green tea, guarana, kava kava, lutein, nettle, passionflower, rosemary, saw palmetto, St. John's wort, thyme, and valerian. Also included are mineral supplements such as calcium, copper, iodine, iron, magnesium, manganese, molybdenum, phosphorous, zinc, and selenium. Other nutraceuticals may include fructooligosaccharides, glucosamine, grapeseed extract, cola extract, guarana, ephedra, inulin, phytosterols, phytochemicals, catechins, epicatechin, epicatechin gallate, epigallocatechin, epigallocatechin gallate, isoflavones, lecithin, lycopene, oligofructose, polyphenols, flavanoids, flavanols, flavonols, and psyllium as well as weight loss agents such as chromium picolinate and phenylpropanolamine. Exemplary vitamins and co-enzymes include water or fat soluble vitamins such as thiamin, riboflavin, nicotinic acid, pyridoxine, pantothenic acid, biotin, folic acid, flavin, choline, inositol and para-aminobenzoic acid, carnitine, vitamin C, vitamin D and its analogs, vitamin A and the carotenoids, retinoic acid, vitamin E, vitamin K, vitamin B6, and vitamin B12. Combinations comprising at least one of the foregoing nutraceuticals may be used.

Suitable medicaments may include oral care agents, throat care agents, allergy relief agents, and general medical care agents. General medical care agents may include antihistamines, decongestants (sympathomimetics), antitussives (cough suppressants), antiinflammatories, homeopathic agents, expectorants, anesthetics, demulcents, analgesics, anticholinergics, throat-soothing agents, antibacterial agents, antiviral agents, antifungal agents, antacids, antinauseants, chemotherapeutics, diuretics, psychotherapeutic agents, cardiovascular agents, various alkaloids, laxatives, appetite suppressants, ACE-inhibitors, anti-asthmatics, anti-cholesterolemics, antidepressants, anti-diarrhea preparations, anti-hypertensives, anti-lipid agents, acne drugs, amino acid preparations, anti-uricemic drugs, anabolic preparations, appetite stimulants, bone metabolism regulators, contraceptives, endometriosis management agents, enzymes, erectile dysfunction therapies such as sildenafil citrate, fertility agents, gastrointestinal agents, homeopathic remedies, hormones, motion sickness treatments, muscle relaxants, osteoporosis preparations, oxytocics, parasympatholytics, parasympathomimetics, prostaglandins, respiratory agents, sedatives, smoking cessation aids such as bromocriptine or nicotine, tremor preparations, urinary tract agents, anti-ulcer agents, anti-emetics, hyper- and hypoglycemic agents, thyroid and anti-thyroid preparations, terine relaxants, erythropoietic drugs, mucolytics, DNA and genetic modifying drugs, and nutritional supplements, including nutraceuticals, micronutrients, vitamins and co-enzymes. The pharmaceutically acceptable salts and prodrugs of the medicaments are also included unless specified otherwise. Some of these medicaments may serve more than one purpose. Combinations of the foregoing types of optional medicaments can be used. Two or more medicaments that have activity against the same or different symptoms can be used together in a combination.

Other suitable and desirable additives are described in standard texts, such as "Handbook of Industrial Chemical Additives", ed. M. and I. Ash, $2^{nd}$ Ed., (Synapse 2000).

One can prepare the mixtures according to the present invention by means of extraction from the *stevia* plant according to techniques well known in the art.

Generally, steviol glycosides can be extracted from the leaves of *stevia* plant with water or alcohols (ethanol or methanol). The leaves may be first crushed into small pieces and then extracted with hot water. Generally this procedure is repeated at least twice. The extraction can be carried out at room temperature but preferably at an elevated temperature, up to 95 degrees centigrade. The extraction time can be from 2 to 10 hours depending on the extraction conditions. When under hot water extraction, 2-4 hours would suffice. After filtration to remove the plant residue, the solution can be passed through an adsorption resin column. After washing with deionized water, the steviol glycosides can be eluted from the resin by ethanol or methanol, or an alcohol-water solution. The extract may then be filtered, desalinated, and concentrated before it being de-colorized with activated carbon or ion exchange resin. This refined solution can be either vacuum dried or spray dried to furnish an off-white powder with steviol glycoside content of 95% or higher.

A typical composition of steviol glycosides generated through the above process consists of stevioside as the major ingredient followed by rebaudioside A, rebaudioside C, dulcoside A along with other minor steviol glycosides.

The mixture of stevioside/rebaudioside A according to the present invention can be generated from a mixture of steviol glycosides purification methods generally known in the art. An example of a suitable method is reversed-phased chromatography. Reversed-phased chromatography refers to any chromatographic methods that use a non-polar stationary phase, in which the binding of mobile phase solute to an immobilised n-alkyl hydrocarbon occurs via hydrophobic interaction. The most common reversed-phase material is octadecyl carbon chain (C18) bonded silica, followed by C-8 bonded silica. Other stationary phases that can also be employed are polystyrene divinylbenzene polymer based resin, such as Dow AMBERCHROM™ chromatographic grade resin or Mitsubishi Chemical synthetic absorbents such as DIAION HP-20. The mobile phase usually consists of water and water-miscible organic solvents. The most commonly used organic solvents are methanol, acetonitrile, ethanol and isopropanol. Elution can be isocratic, gradient or step-wise increasing the percentage of organic solvents. The pH of the mobile phase is usually kept at neutral.

The temperature can impact on the elution time of steviol glycosides. In a particular embodiment of the invention, the temperature is held constant within a range of 30 to 60 degrees centigrade. Chromatographic separation can be monitored by UV at 210 nm or evaporative light scattering detector (ELSD) and the fractions containing a desired mixture of stevioside/rebaudioside A can be combined accordingly.

Through such chromatographic procedures, the desired mixture of stevioside/rebaudioside A can be produced and the minor steviol glycosides, such as rebaudioside C and dulcoside A, which can contribute bitterness off-taste at above certain levels, can be removed.

Alternatively, the stevioside/rebaudioside A mixture according to the present invention can also be produced from a steviol glycosides mixture using crystallization processes.

In a particular embodiment, a steviol glycoside extract is dissolved in 50-90% methanol or ethanol-water at a temperature in the range of 60-90 degrees centigrade under stirring for 1-3 hours. After the complete solubilization of the extract, the solution is kept at room temperature overnight. The precipitate formed can be filtered and dried. The precipitate can contain upwards of 80% stevioside, with lower amounts of rebaudioside A and a trace of rebaudioside C (below 1%).

Addition of appropriate amounts of rebaudioside A, or a mixture rich in rebaudioside A, to this precipitate can be made in order to arrive at mixtures of the present invention.

A specific example to generate a mixture of stevioside/rebaudioside A is given in Example 1, below.

However, the mixtures according to the present invention can also be prepared simply by admixing in the required ratios the single ingredients stevioside and rebaudioside A. Whereas it is counter-intuitive, to mix the potent rebaudioside A in a highly pure form with stevioside when the latter is regarded as being of lower potency, the advantage of using pure stevioside and rebaudioside A to produce a mixture consisting essentially of these two individual ingredients within the aforementioned ratio will reside in constant and reproducible sweetness enhancing effects that can be assured by mixing single ingredients.

Rebaudioside A may be employed in a mixture according to the invention in a purity of greater than 80%, more particularly greater than 90%, still more particularly greater than 97%, and more particular still greater than 99%. Commercially available rebaudioside A products are well known to a person skilled in the art and not further discussion is merited here.

Similarly stevioside may be employed in a mixture according to the invention in a purity of greater than 80%, more particularly greater than 90%, still more particularly greater than 95%. Once again, commercially available stevioside products are well known to a person skilled in the art and not further discussion is merited here.

There now follows a series of examples that serve to illustrate the invention.

EXAMPLE 1

Preparation of a Mixture of Stevioside and Rebaudioside A

The commercial steviol glycoside extract marketed as KAL brand by Nutraceutical Corp. was purified using a Flash chromatography system made by Biotage. The cartridge employed was C-18 40+ M and gradient steps with increasing methanol content in water as shown below. Flow rate 30 mL/min. UV detection at 210 nm and 254 nm. The eluent was collected into test tubes (27 mL in each).

| | MeOH in water (%) | Flow Rate (mL/min) | Volume (mL) |
|---|---|---|---|
| Step 1 | 40 | 30 | 264 |
| Step 2 | 40-80 | 30 | 1320 |
| Step 3 | 80 | 30 | 264 |
| Step 4 | 100 | 30 | 264 |

The chromatographic fractions were analyzed by analytical HPLC and combined accordingly. The fractions were pooled and lyophilized after removing the methanol. $^{1}$H NMR and HPLC analyses indicated that the combined fraction consisted of a mixture of stevioside and rebaudioside A in a ratio of 3:1.

Initial tasting indicated that the above mixture had more upfront sweetness, had more body and had a less lingering profile.

EXAMPLE 2

Comparison of the Upfront Sweetness of Stevioside/Rebaudioside A (3:1) and (2:1) with Stevioside and Rebaudioside A Two mixtures, stevioside/rebaudioside A (3:1) and (2:1) were evaluated for their upfront sweetness in comparison with pure stevioside and rebaudioside A. Sensory evaluation was carried out with 5 experienced tasters. 30 ppm of stevioside/rebaudioside A (3:1), (2:1), and Rebaudioside A on top of 5% sucrose solution were prepared along with 20, 35, 45, 75 ppm stevioside in 5% sucrose solutions. Samples were prepared fresh and at room temperature and were paired and tasted with water rinsing in-between.

Stevioside/rebaudioside A (3:1) was ranked with the most upfront sweetness followed by stevioside/rebaudioside A (2:1), rebaudioside A, steviosides. The sample containing 75 ppm stevioside was ranked as the sweetest but not the most upfront one. The pure stevioside samples were described as delayed onset and lack of the upfront sweetness. Therefore, stevioside and rebaudioside A individually can not provide the desire upfront sweetness, body, less lingering as the mixtures do.

EXAMPLE 3

Sweetness Threshold Determination of Stevioside/Rebaudioside A (3:1) and (2:1)

Stevioside/rebaudioside A (3:1) and (2:1) were prepared at 30, 35, 40, and 45 ppm levels and evaluated by 4 experienced tasters in water for their iso-intensities to sucrose solutions (0.5, 1.0, and 1.5% sucrose). Samples and references were paired and tasted with rinsing of the mouth with water in-between.

It was found that 40-45 ppm level of stevioside/Rebaudioside A (3:1) and 35-40 ppm of stevioside/Rebaudioside A (2:1) was close to 1% sucrose, the sweetness threshold level. The exact sucrose equivalence levels around the sweetness threshold were determined as shown below in Examples 4 and 5.

EXAMPLE 4

Ranking Test of 30 and 45 Ppm Stevioside/Rebaudioside A (3:1) in Water, Determining its Sucrose Iso-Intensity Using a Formal Sensory Panel The sensory evaluation was conducted using a ranking method. Samples at ambient temperature were randomly presented in 20 ml blind aliquots (unidentifiable by panelists). Panels consisted of 20 sweet sensitive subjects and samples were presented in 2 replications over 1 session. After tasting each sample, the mouth was rinsed thoroughly with water at ambient temperature prior to tasting the next sample. Panelists were presented with 0.5%, 1.0%, and 1.5% sucrose solutions in water and two samples of stevioside/rebaudioside A at 30 and 45 ppm in water, respectively. Subjects were asked to rank the samples from low to high with respect to perceived sweet taste. R-indices were calculated for 30 and 45 ppm stevioside/rebaudioside A samples versus either 0.5%, 1.0% or 1.5% sucrose.

Stevioside/Rebaudioside a (3:1) at 30 ppm in Water

| Sample sweetness | Sucrose solutions [% wt/wt] | R-index [%] | Critical Value Range [%] | p-value |
|---|---|---|---|---|
| sweeter | 0.5% | 19.50 | 37.76-62.24 | $P < 0.05$ |
| less sweet | 1.0% | 66.62 | 37.76-62.24 | $P < 0.05$ |
| less sweet | 1.5% | 96.12 | 37.76-62.24 | $P < 0.05$ |

An R-index 19.50%, which is below the critical value (37.76), means that the 30 ppm stevioside/rebaudioside A (3:1) sample is more sweet than 0.5% sucrose. An R-index of 66.62% or 96.12%, which is above the critical value (62.24%), means the sample is significantly less sweet than 1.0% or 1.5% sucrose.

By interpolation, the sweetness of 30 ppm stevioside/rebaudioside A (3:1) is equivalent to about 0.75% sucrose. Stevioside/Rebaudioside a (3:1) at 45 ppm

| Sample sweetness | sucrose solutions [% wt/wt] | R-index [%] | Critical Value Range [%] | p-value |
|---|---|---|---|---|
| sweeter | 0.5% | 1.94 | 37.76-62.24 | P < 0.05 |
| sweeter | 1.0% | 19.94 | 37.76-62.24 | P < 0.05 |
| less sweet | 1.5% | 70.88 | 37.76-62.24 | P < 0.05 |

An R-index 1.94 and 19.94%, which is below the critical value (37.76), means that the 45 ppm stevioside/rebaudioside A (3:1) sample is more sweet than 0.5% and 1.0% sucrose solutions. An R-index of 70.88%, which is above the critical value (62.24%), means the 45 ppm stevioside/rebaudioside A (3:1) sample is significantly less sweet than 1.5% sucrose.

By interpolation, the sweetness of 45 ppm stevioside/rebaudioside A (3:1) is equivalent to about 1.25% sucrose.

EXAMPLE 5

Ranking Test of 35 and 40 Ppm Stevioside/Rebaudioside A (3:1) in Water, Determining its Sucrose Iso-Intensity Using a Formal Sensory Panel The sensory evaluation was conducted using the same method as described in Example 4. Panels consisted of 20 sweet sensitive subjects and samples were presented in 2 replications over 1 session. Panelists were presented with 20 mL of 0.5%, 1.0%, and 1.5% sucrose solutions in water and two samples of stevioside/rebaudioside A (3:1) at 35 and 40 ppm in water, respectively. Subjects were asked to rank the samples from low to high with respect to perceived sweet taste. R-indices were calculated for 35 and 40 ppm stevioside/rebaudioside A samples versus either 0.5%, 1.0% or 1.5% sucrose.

Stevioside/rebaudioside A (3:1) at 35 ppm in water

| Sample sweetness | Sucrose solutions [% wt/wt] | R-index [%] | Critical Value Range [%] | p-value |
|---|---|---|---|---|
| sweeter | 0.5% | 16.50 | 37.76-62.24 | P < 0.05 |
| Iso-sweet | 1.0% | 54.74 | 37.76-62.24 | P < 0.05 |
| less sweet | 1.5% | 92.75 | 37.76-62.24 | P < 0.05 |

An R-index 16.50%, which is below the critical value (37.76), means that the 35 ppm stevioside/rebaudioside A (3:1) sample is more sweet than 0.5% sucrose. An R-index of 54.74%, which is between the critical values (37.76-62.24%), means the ppm stevioside/rebaudioside A (3:1) sample is iso-sweet to 1.0% sucrose. An R-index of 92.75%, which is above the critical value (62.24), means the sample is significantly less sweet than 1.5% sucrose in water.

Stevioside/rebaudioside A (3:1) at 40 ppm

| Sample sweetness | sucrose solutions [% wt/wt] | R-index [%] | Critical Value Range [%] | p-value |
|---|---|---|---|---|
| sweeter | 0.5% | 8.06 | 37.76-62.24 | P < 0.05 |
| sweeter | 1.0% | 36.78 | 37.76-62.24 | P < 0.05 |
| less sweet | 1.5% | 86.13 | 37.76-62.24 | P < 0.05 |

An R-index 8.06 and 36.78%, which is below the critical value (37,76), means that the 40 ppm stevioside/rebaudioside A (3:1) sample is more sweet than 0.5% and 1.0% sucrose solutions. An R-index of 86.13%, which is above the critical value (62.24%), means the 40 ppm stevioside/rebaudioside A (3:1) sample is significantly less sweet than 1.5% sucrose.

By interpolation, the sweetness of 40 ppm stevioside/Rebaudioside A (3:1) is equivalent to about 1.25% sucrose.

EXAMPLE 6

Iso-Intensity of 35 ppm Stevioside/Rebaudioside A (3:1) in 5.0% Sucrose Solution Using a Formal Sensory Panel The sensory evaluation was conducted using the same method as described in Example 4. Panels consisted of 20 sweet sensitive subjects and samples were presented in 2 replications over 1 session. Panelists were presented with 20 mL of 5.5%, 6.0%, 6.5%, 7.0%, 8.0% sucrose solutions and one sample of 35 ppm stevioside/rebaudioside A in 5.0% sucrose, respectively. Subjects were asked to rank the samples from low to high with respect to perceived sweet taste. R-indices were calculated for 35 ppm stevioside/rebaudioside A in 5.0% sucrose sample versus either 6.0%, 6.5%, 7.0% or 8.0% sucrose.

Sweetness Enhancing Effect for 35 ppm Stevioside/Rebaudioside a (3:1) in 5% Sucrose

| Sample sweetness | sucrose solutions [% wt/wt] | R-index [%] | Critical Value Range [%] | p-value |
|---|---|---|---|---|
| sweeter | 6.0% | 23.47 | 37.76-62.24 | P < 0.05 |
| sweeter | 6.5% | 31.91 | 37.76-62.24 | P < 0.05 |
| Iso-sweet | 7.0% | 60.56 | 37.76-62.24 | P < 0.05 |
| less sweet | 8.0% | 91.56 | 37.76-62.24 | P < 0.05 |

An R-index 23.47% and 31.91%, which is below the critical value (37.76), means that the 35 ppm stevioside/rebaudioside A (3:1) in 5.0% sucrose sample is more sweet than 6.0% and 6.5% sucrose. An R-index of 60.56%, which is between the critical values (37.76-62.24%), means the sample is iso-sweet to 7.0%. An R-index of 91.56%, which is above the critical value (62.24), means the sample is significantly less sweet than 8.0% sucrose in water. 35 ppm stevioside/rebaudioside A (3:1) in water was determined to be iso-sweet to 1.0% sucrose (Example 5). 35 ppm stevioside/rebaudioside A (3:1) in 5.0% sucrose tasted significantly sweeter than 6% sucrose, which is the sucrose concentration that the 35 ppm stevioside/rebaudioside A (3:1) in 5% sucrose sample would be expected to taste iso-sweet to, assuming a merely additive effect. However, 35 ppm stevioside/rebaudioside A (3:1) on top of 5% sucrose was determined to be iso-sweet to a 7% sucrose solution.

Accordingly, the mixture provided an additional 1.0% sucrose equivalence, clearly showing a sweetness enhancing effect.

EXAMPLE 7

Stevioside Iso-Intensity

Two ounces of each sample was presented in random order to 20 sweet sensitive panelists. In two replications (over 1 session), Panelists were asked to rank the samples from least sweet to most sweet. The data were subjected to an R-index analysis.

| Solutions compared | R-index | Critical Value Range (Non-significant range) | Significantly different ($p < 0.05$) | More Sweet Sample |
|---|---|---|---|---|
| 30 ppm Stevioside vs. 0.5% sucrose | 25.625 | 37.76% to 62.24% | Yes | 30 ppm Stevioside |
| 30 ppm Stevioside vs. 1.0% sucrose | 66.938 | 37.76% to 62.24% | Yes | 1.0% sucrose |
| 30 ppm Stevioside vs. 1.5% sucrose | 94.750 | 37.76% to 62.24% | Yes | 1.5% sucrose |
| 40 ppm Stevioside vs. 0.5% sucrose | 11.375 | 37.76% to 62.24% | Yes | 40 ppm Stevioside |
| 40 ppm Stevioside vs. 1.0% sucrose | 29.094 | 37.76% to 62.24% | Yes | 40 ppm Stevioside |
| 40 ppm Stevioside vs. 1.5% sucrose | 82.219 | 37.76% to 62.24% | Yes | 1.5% sucrose |
| 30 ppm Stevioside vs. 40 ppm Stevioside | 80.188 | 37.76% to 62.24% | Yes | 40 ppm Stevioside |

30 ppm Stevioside was perceived to be more sweet than 0.5% sucrose in water and significantly less sweet than 1.0% and 1.5% sucrose in water (the calculated R-index values exceeding the critical values at $p<0.05$). From these results it was determined that 30 ppm Stevioside was perceived to be isosweet to 0.75% sucrose by interpolation.

40 ppm Stevioside was perceived to be more sweet than 0.5% and 1.0% sucrose in water and significantly less sweet than 1.5% sucrose in water (the calculated R-index values exceeding the critical values at $p<0.05$). From these results it can be assumed that 40 ppm Stevioside was perceived to be isosweet to 1.25% sucrose by interpolation. 30 ppm Stevioside was perceived to be significantly less sweet than 40 ppm Stevioside in water (the calculated R-index values exceeding the critical values at $p<0.05$).

From these data it was determined that 35 ppm Stevioside is isosweet to 1.0% sucrose.

EXAMPLE 8

35 ppm Stevioside Iso-Intensity in 5% Sucrose Solution

The objective of this test was to determine the extent to which stevioside enhances sweetness perception of a 5% sucrose solution.

| compared | R-index | Critical Value Range (Non-significant range) | Significantly different ($p < 0.05$) | More Sweet Sample |
|---|---|---|---|---|
| 5% sucrose + 35 ppm Stevioside vs. 5.0% sucrose | 8.281 | 37.76% to 62.24% | Yes | 5% sucrose + 35 ppm Stevioside |
| 5% sucrose + 35 ppm Stevioside vs. 6.0% sucrose | 21.094 | 37.76% to 62.24% | Yes | 5% sucrose + 35 ppm Stevioside |
| 5% sucrose + 35 ppm Stevioside vs. 7.0% sucrose | 78.125 | 37.76% to 62.24% | Yes | 7.0% sucrose |

5% sucrose+Stevioside was perceived to be significantly more sweet than 5.0% and 6.0% sucrose and significantly less sweet than 7.0% sucrose (the calculated R-index values exceeding the critical values at $p<0.05$). From these data it can be derived that 5% sucrose+Stevioside is perceived to be iso-sweet to 6.5% sucrose in water by interpolation. As we see in Example 7, 35 ppm Stevioside was shown to be isosweet to 1.0% sucrose in water. Accordingly, 35 ppm Stevioside on top of 5% sucrose is showing an additional 0.5% sucrose equivalence, which is less than the enhancing effect observed for the stevioside/rebaudioside A mixtures of the present invention.

EXAMPLE 9

Rebaudioside A Iso-Intensity

In an iso-intensity study, 30 ppm rebaudioside A was found to be iso-intense with 1% sucrose.

This example examined the effect of 30 ppm rebaudioside A on top of 5% sucrose.

| Solutions compared | R-Index | Critical value range | significant | More sweet sample |
|---|---|---|---|---|
| 5% sucrose + 30 ppm RebA vs. 5% sucrose | 1.313 | 37.76% to 62.24% | Yes | 5% sucrose + 30 ppm RebA |
| 5% sucrose + 30 ppm RebA vs. | 22.625 | 37.76% to 62.24% | Yes | 5% sucrose + 30 ppm RebA |

-continued

| Solutions compared | R-Index | Critical value range | significant | More sweet sample |
|---|---|---|---|---|
| 6% sucrose 5% sucrose + | 89.000 | 37.76% to 62.24% | Yes | 7% sucrose |

-continued

| Solutions compared | R-Index | Critical value range | significant | More sweet sample |
|---|---|---|---|---|
| 30 ppm RebA vs. 7% sucrose | | | | |

The data show that 5% Sucrose+30 ppm rebaudioside A was perceived to be significantly more sweet than 5% Sucrose and significantly less sweet than 7% Sucrose (the calculated R-index values exceeding the critical values at $p<0.05$). By interpolation, 5% Sucrose+30 ppm rebaudioside A was isosweet to 6.5% sucrose. Given that 30 ppm rebaudioside A was found to be isosweet to 1.0% sucrose, it follows that when placed on top of 5% sucrose there is a 0.5% sucrose equivalence in enhancement, which is less than the enhancing effect observed for the stevioside/rebaudioside A mixtures of the present invention.

The invention claimed is:

1. A sweetened consumable composition comprising a sweetener and a mixture consisting essentially of individual pure stevioside and pure rebaudioside A ingredients with an admixed ratio of stevioside to rebaudioside A of about 2:1 to about 4:1, wherein said stevioside has a purity of greater than 80%, wherein said rebaudioside A has a purity of greater than 80%, wherein said mixture is added to the sweetened consumable at a concentration of 30 ppm to 45 ppm, wherein the mixture is present in said sweetened consumable composition at a concentration that is not perceived as sweet, wherein the mixture is present at a concentration that is iso-sweet with less than 1.25% sucrose solution, wherein enhancement of sweetness of the sweetened consumable composition is the same or better than sweetness enhancement by pure rebaudioside A or pure stevioside, and wherein the mixture displays more body, more upfront sweetness, and less lingering licorice off-taste than rebaudioside A alone in its pure form.

2. The consumable composition of claim 1, wherein said stevioside to rebaudioside A ratio is about 2:1 to about 3:1.

3. The consumable composition of claim 1, wherein said purity of said stevioside is greater than 90%.

4. The consumable composition of claim 3, wherein said purity of said stevioside is greater than 95%.

5. The consumable composition of claim 1, wherein said purity of said rebaudioside A is greater than 90%.

6. The consumable composition of claim 5, wherein said purity of said rebaudioside A is greater than 97%.

7. The consumable composition of claim 6, wherein said purity of said rebaudioside A is greater than 99%.

8. The consumable composition of claim 1, wherein said purity of said stevioside is greater than 95% and said purity of said rebaudioside A is greater than 99%.

9. The consumable composition of claim 1, wherein said mixture is iso-sweet with 1% sucrose solution.

10. The consumable composition of claim 1, wherein said sweetener is selected from the group consisting of sucrose, fructose, glucose, high fructose corn syrup, corn syrup, xylose, arabinose, rhamnose, erythritol, xylitol, mannitol, sorbitol, inositol, acesulfame potassium, aspartame, neotame, sucralose, saccharine and combinations thereof.

11. The consumable composition of claim 10, wherein said sweetener is present in an amount of 0.0001% to 15% by weight of said consumable composition.

12. The consumable composition of claim 1, comprising one or more compounds selected from the group consisting of trilobatin, hesperetin dihydrochalcone glucoside, naringin dihydrochalcone, mogroside V, Luo Han Guo extract, rubusoside, rubus extract, glycyphyllin, isomogroside V, mogroside IV, siamenoside I, neomogroside, mukurozioside IIb, (+)-hernandulcin, 4β-hydroxyhernandulcin, baiyunoside, phlomisoside I, bryodulcoside, bryoside bryonoside, abrusosides A-E, cyclocarioside A, cyclocaryoside I, albiziasaponins A-E, glycyrrhizin, araboglycyrrhizin, periandrins I-V, pterocaryosides A and B, osladin, polypodosides A and B, telosmoside A8-18, phyllodulcin, huangqioside E neoastilbin, monatin, 3-acetoxy-5,7-dihydroxy-4'-methoxyflavanone, 2R,3R-(+)-3-Acetoxy-5,7,4'-trihydroxyflavanone, (2R,3R)-dihydroquercetin 3-O-acetate, dihydroquercetin 3-O-acetate 4'-methyl ether, brazzein, curculin, mabinlin, monellin, neoculin, pentadin, thaumatin and combinations thereof.

13. The consumable composition of claim 2, wherein said stevioside to rebaudioside A ratio is about 3:1.

* * * * *